Patented Apr. 13, 1948

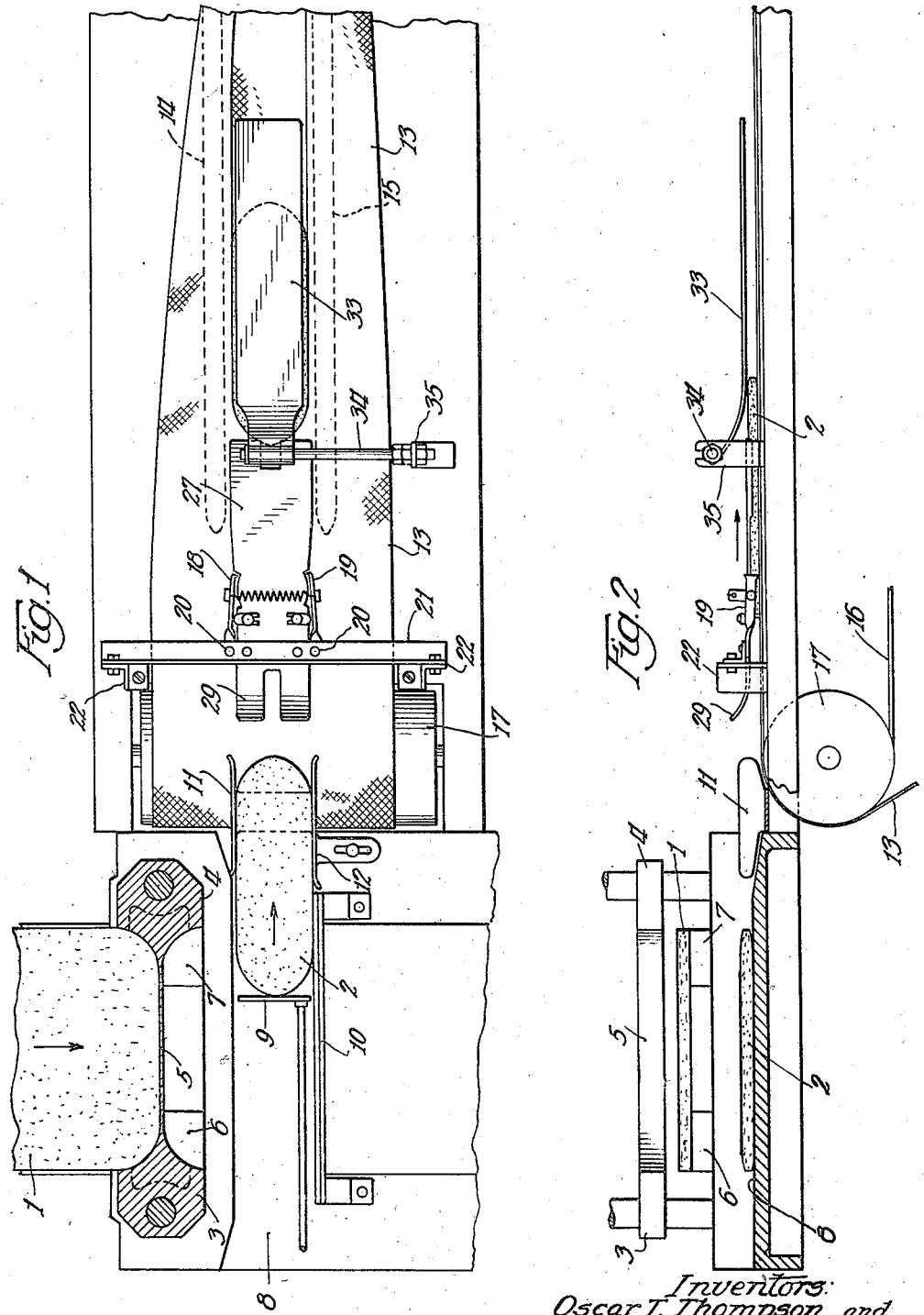

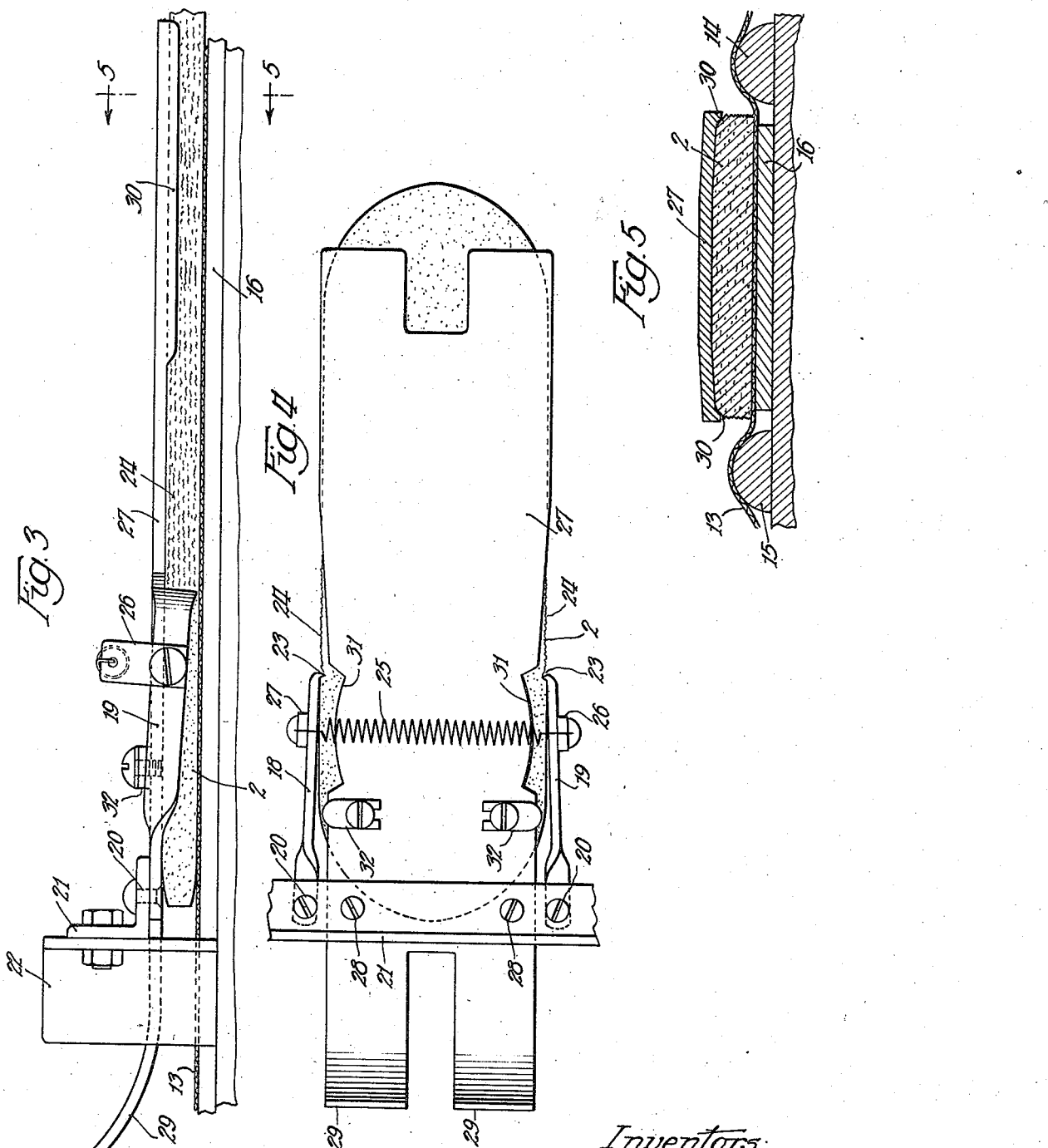

2,439,761

UNITED STATES PATENT OFFICE 2,439,761

APPARATUS AND METHOD FOR SOFTENING SANITARY NAPKIN PADS

Oscar T. Thompson, Neenah, Wis., and Don D. Feagles, Niagara Falls, N. Y., assignors to International Cellucotton Products Company, Chicago, Ill., a corporation of Delaware Application October 26, 1944, Serial No. 560,514

9 Claims. (Cl. 154—29)

This invention relates to a method and apparatus for softening sanitary napkin pads which, in the process of manufacture, have imparted thereto, an undesirable hardness.

In the manufacture of some sanitary napkins, an absorbent blanket consisting at least in part of a plurality of plies of absorbent crepe tissue paper material is passed through suitable die cutting or shearing mechanism which successively cuts from the end of the blanket, sanitary napkin pads of the required width. It has been found that the cutting operation has a tendency to compress the pad edges to such an extent that at least some, if not all, of the plies of sheet material become united or welded together at their edges. Such hardened edges, even when covered with the usual gauze wrapper and special edge coverings are objectionable because they have a tendency to chafe the wearer. They are also objectionable because the interattachment of the sheet material, which causes the hardened edges, has the effect of resisting relative movement of the plies and thereby causes a stiffening or over-all hardening of the pad.

While the chafing effect may be more or less overcome by the provision of special edge coverings, such edge coverings do not overcome the said stiffening or overall hardening which is imparted to the pad by reason of the rigidity of the pad structure when the edges of the plies are welded together. The pad in which the plies are so united may be described as a laminated structure and the entire pad structure becomes relatively hard, stiff and unyielding due to the fixed relationship of the plies of the pad.

The main object of the present invention is to produce a method and apparatus for softening sanitary napkin pads and for softening the edges of such pads which, because of the method of manufacture, are initially hardened to an objectionable degree. Other objects are to provide a method and apparatus for the purpose indicated which may be practiced in connection with conventional forms of pad-making machinery without requiring extensive modifications thereof; and to provide apparatus for the purpose which is extremely simple and durable but highly effective for the purpose indicated.

Other objects and advantages of the invention will be understood by reference to the following specification and accompanying drawings (two sheets) wherein there is illustrated a selected form of apparatus embodying the invention and which apparatus is operative to practice the improved method referred to above.

In the drawings:

Fig. 1 is a plan;

Fig. 2 is a side elevation, partially in section;

Fig. 3 is a side elevation corresponding to a portion of Fig. 2 but on an enlarged scale;

Fig. 4 is a fragmentary plan of the mechanism shown in Fig. 3 but on a slightly smaller scale, and Fig. 5 is a section on the line 5—5 of Fig. 3.

In the drawings a multi-ply crepe tissue material blanket is indicated at 1 from which sanitary napkin pads 2 are cut. In one form of pad-making apparatus, the blanket 1 is fed endwise between punch and die-cutting mechanism here represented as a pair of end punches 3 and 4 interconnected by a cutting blade 5 and cooperating dies 6 and 7 set in a suitable table or frame of the apparatus. The punch and die mechanism shown is designed to provide a pad with rounded ends substantially as is shown in Thompson Patent No. 1,869,177, July 26, 1932.

The pad 2 with rounded ends is delivered from the cutting or shearing mechanism to a table 8 from which it is moved endwise by means of a reciprocated pusher 9. The pad is, of course, guided in its endwise movement by suitable side guides, such as indicated at 10, 11 and 12. From the table 8, the pad is delivered to a continuously traveling web 13 of gauze which is folded longitudinally around the pad by means of folders which are indicated in part at 14 and 15, such folding means being somewhat more fully shown in Thompson Patent No. 2,138,587, November 29, 1938.

The gauze web 13 is propelled continuously by means of a continuously driven belt 16, which is guided and driven by a suitably driven pulley 17 or like means. The gauze web 13 is drawn from a supply roll suitably mounted beneath the conveyor belt 16 and after it is folded around the pads, cutting means operates to cut the folded gauze at a pre-determined point intermediate successive pad units.

Incident to the pad shearing operation, the edges of the pad plies are more or less drawn together and the fibers thereof interlocked, thereby in effect welding the plies together at their edges. Such joining of the plies produces a hard edge and, as already explained, effects hardening of the pad over its entire area. This hardening effect may be partially avoided by sawing the pads from the blanket by means of a rotary saw as shown in said Thompson patent but die cutting is preferred for a number of practical reasons, and is especially desirable when it is accompanied by the following described means for breaking down the hardened edges formed by such die cutting.

Such hardened pad edges and overall hardening is eliminated by passing the pad units 2 between a pair of scrapers or combs 18 and 19, which are pivotally mounted on opposite sides of the path of travel of the pads as indicated at 20—20. The pivots 20 may be supported by a suitable angle-iron cross bar 21 carried by suitable brackets or posts 22, which extend upwardly from the framework of the conveyor structure. As shown, the scrapers 18 and 19 consist of elongated metal pieces having their free ends hammered to provide sharpened inwardly projecting edges 23, which engage the edges 24 of the pad unit 2. A suitable tension spring 25 is stretched between the scrapers 18 and 19 near their free ends and serve to yieldingly hold the fingers against the pad edges with approximately the same degree of pressure at both sides. The spring 25 may be connected to the respective scrapers 18 and 19 through the agency of upstanding bracket pieces, such as indicated at 26 so that the spring is located substantially above the plane of travel of the pad 2.

The scrapers 18 and 19 are effective to break down the joints between the plies of the pad and more or less ruffle or fluff the edges of said plies. Hence the overall pad hardness is eliminated while the hard edges themselves are also made soft. The fluffing effect on the edges of the plies of the pad is also beneficial on pads which have been made by means which do not necessarily effect the ply edge welding referred to.

The scraping operation is best effected while holding the pad under slight compression against the gauze web so as to prevent expansion of the pad thickness and so as to insure its travel in unison with the belt 16 and gauze web 13. For that purpose there is provided a compression plate 27 which is mounted as indicated at 28 on the cross bar 21, the receiving end of the plate being rolled upwardly slightly as indicated at 29 (Fig. 3) to insure entrance of the pad thereunder without catching on the end of the plate. At the discharge end of the plate, it is slightly curved or arched transversely as shown in Fig. 5 and its edges are provided with shallow depending ribs 30—30 which together with the arched form of the plate serve to apply a sufficient amount of pressure to impart to the pad a desirable convex shape. The pressure applied by plate 27—27 and its edge ribs 30—30, is not sufficient to effect welding of any of the plies together but merely produces a slight shaping effect on the pad over its entire width. The edges of the plate 27 are suitably recessed as indicated at 31—31 (Fig. 4) to avoid any interference with the free operation of the scrapers 18 and 19. Suitable stops 32—32 may be adjustably mounted on the top of the plate 27 for limiting inward movement of the scrapers 18 and 19 under the influence of the spring 25.

For further holding the pad down on the gauze web during the folding operation, a suitable elongated holding plate 33 may yieldingly bear against the top surface of the pad, the holding plate being supported as best shown in Figs. 1 and 2 by means of a supporting rod 34 secured to a suitable post or bracket 35 which extends upwardly from a portion of the gauze conveyor framework.

It has been found that a pad severed from a blanket, whether by punch and die mechanism as described or by rotary saw cutting means, and subjected to an edge combing action as explained, has an improved degree of softness and that the pad edges are so fluffed that special edge coverings or cushion strips, such as are now being extensively used, may be omitted without material impairment of the comfort characteristics of the pad.

The described apparatus may be modified in various respects without departing from the principles of the invention as indicated in the foregoing description and explanation.

We claim:

1. The method of preparing absorbent pads for sanitary napkins which consists in shearing a pad of the desired size from a blanket composed of a plurality of relatively superposed plies of crepe tissue paper and then subjecting certain of the sheared edges of the pad to a combing action to break down or fluff said sheared edges.

2. The method of preparing absorbent pads for sanitary napkins which consists in shearing an elongated pad of predetermined width from a multi-ply blanket of crepe tissue paper, the shearing operation being effected in such a manner that the sheared edges of the plies of the pad are more or less united and form hardened edges as an incident to said shearing operation, and then propelling the pad endwise between combing or scraping means to break down said united hardened edges.

3. Apparatus for softening the edges of an elongated multi-ply, crepe tissue paper pad which is hard as an incident to compression of the pad edges and mechanical joining of the edges of the corresponding edges of the plies, comprising means for propelling the pad endwise, a pair of scraper members yieldingly urged against the opposite pad edges during the travel of the pad to thereby effect separation and fluffing of the edges of the sheet material plies of the pad, and means for restraining expansion of the thickness of the pad while the pad is engaged by said scraper members.

4. Means for softening the edges of a multi-ply, crepe tissue paper pad which is hard as an incident to compression and mechanical interattachment of the corresponding edges of the plies, comprising means for propelling the pad endwise, a pair of scraper members yieldingly urged against the opposite pad edges during the travel of the pad to thereby effect separation and fluffing of the edges of the sheet material plies of the pad, means for limiting the movement of said scraper members inwardly of the pad edges, and means for restraining expansion of the thickness of the pad while the pad is engaged by said scraper members.

5. The method of preparing absorbent pads for sanitary napkins which consists in shearing an elongated pad of predetermined width from a multi-ply blanket of crepe tissue paper, the shearing operation being effected in such a manner that the sheared edges of the plies of the pad are more or less united and form hardened edges as an incident to said shearing operation, and then while holding the thickness of the pad against expansion, propelling the pad endwise between combing or scraping means to break down said united and hardened edges.

6. The method of preparing absorbent pads for sanitary napkins which consists in shearing a pad of the desired size from a blanket composed of a plurality of relatively superposed plies of crepe tissue paper and then, while holding the thickness of the pad against expansion, subjecting certain of the sheared edges of the pad to a combing action to break down or fluff said sheared edges.

7. In apparatus of the class described, the combination of means for die cutting an elongated pad from a multi-ply, crepe tissue paper blanket, the die cut side edges of the pad being hardened by the interattachment of the ply edges incident to said die cutting, means for propelling the pad endwise, and means acting on the die cut, hardened side edges of the propelled pad to soften the same.

8. Apparatus for softening the edges of an elongated, multi-ply, crepe tissue paper pad which is hard as an incident to compression of the pad edge and mechanical joining of the corresponding edges of the plies, comprising means for propelling the pad endwise, and a scraper across which said edge is dragged as an incident to said endwise propulsion of the pad, and means for maintaining said pad edge in engagement with said scraper during said propulsion, whereby the joined ply edges are separated and said hard pad edge is softened.

9. Apparatus for softening the edges of an elongated, multi-ply, crepe tissue paper pad which is hard as an incident to compression of the pad edges and mechanical joining of the edges of the corresponding edges of the plies, comprising means for propelling the pad endwise, and a pair of scraper members yieldingly urged against the opposite pad edges during the travel of the pad to thereby effect separation and fluffing of the edges of the sheet material plies of the pad.

OSCAR T. THOMPSON.
DON D. FEAGLES.

REFERENCES CITED

The following references are of record in the file of this patent:

UNITED STATES PATENTS

| Number | Name | Date |
|---|---|---|
| 857,133 | Whitmarsh | June 18, 1907 |
| Re. 16,603 | Thomas | Apr. 19, 1927 |
| 1,869,177 | Thompson | July 26, 1932 |
| 2,010,997 | Jurgensen | Aug. 13, 1935 |